United States Patent
Caldwell et al.

(10) Patent No.: US 7,765,432 B2
(45) Date of Patent: Jul. 27, 2010

(54) REPORTING DIAGNOSTIC INFORMATION FOR CODE OF AN APPLICATION PROGRAM INTERFACE

(75) Inventors: Gary Caldwell, Redmond, WA (US); Satish Shetty, Redmond, WA (US); Alexander Weil, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 435 days.

(21) Appl. No.: 11/714,972

(22) Filed: Mar. 7, 2007

(65) Prior Publication Data

US 2008/0222455 A1 Sep. 11, 2008

(51) Int. Cl.
G06F 11/00 (2006.01)

(52) U.S. Cl. .............. 714/38; 714/57; 714/53; 717/124; 719/328

(58) Field of Classification Search ............ None
See application file for complete search history.

(56) References Cited

U.S. PATENT DOCUMENTS

| | | | |
|---|---|---|---|
| 5,892,941 A * | 4/1999 | Khan et al. ............ 703/22 |
| 6,401,219 B1 | 6/2002 | Shigeta | |
| 6,944,800 B2 | 9/2005 | Brundridge et al. | |
| 7,028,056 B1 | 4/2006 | Hendel et al. | |
| 7,039,833 B2 | 5/2006 | Knuutila et al. | |
| 7,058,928 B2 * | 6/2006 | Wygodny et al. ............ 717/128 |
| 7,216,336 B1 * | 5/2007 | Ezra et al. ................ 717/124 |
| 2003/0005414 A1 | 1/2003 | Elliott et al. | |
| 2005/0139674 A1 * | 6/2005 | Ishibashi et al. ............ 235/454 |
| 2005/0251794 A1 | 11/2005 | Taylor et al. | |
| 2006/0020858 A1 | 1/2006 | Schaefer | |
| 2006/0150022 A1 | 7/2006 | Malik | |
| 2006/0253837 A1 | 11/2006 | Hudson et al. | |
| 2007/0006226 A1 | 1/2007 | Hendel | |
| 2009/0113303 A1 * | 4/2009 | Goossen et al. ............ 715/719 |

OTHER PUBLICATIONS

Chen, et al., "Path-Based Failure and Evolution Management", http://research.microsoft.com/~emrek/pubs/paths-nsdi.pdf.
Candea, et al., "Automatic Failure-Path Inference: A Generic Introspection Technique for Internet Applications", Date: Jun. 2003, http://dslab.epfl.ch/courses/pods/fall03/readings/candea-afpi.pdf.
Liblit, et al., "Building a Better Backtrace: Techniques for Postmortem Program Analysis", Date: Oct. 2002, http://theory.stanford.edu/~aiken/publications/papers/backtrace.pdf.

* cited by examiner

*Primary Examiner*—Christopher S McCarthy (57) ABSTRACT

A technology for reporting diagnostic information for code of an application program interface is disclosed. In one method approach, diagnostic information for a line of code in a file associated with an application program interface is received. The diagnostic information includes a designation of the line of code. The diagnostic information is stored in a fixed sized buffer. Efficient use of memory is provided without requiring elimination of other diagnostic information previously stored in the fixed sized buffer.

20 Claims, 7 Drawing Sheets

REPORTING DIAGNOSTIC INFORMATION FOR CODE OF AN APPLICATION PROGRAM INTERFACE

BACKGROUND

Computers enable people to perform many types of activities more easily than what can be performed manually. Examples of these activities include but are not limited to typing documents, billing, storing and correlating information in databases, obtaining driving directions, searching for and purchasing items of interest. Many applications have been developed to enable people to perform these activities by executing the applications on one or more computers. Problems can occur as the code associated with the applications executes. Examples of problems that can occur include an inability to obtain storage, an inability for one computer to communicate with another computer, and an unauthorized person modifying code associated with an application, among other things.

Frequently, technical people who work for the companies that sell the applications have to determine what caused the problem. Conventional applications frequently provide no information about a problem. When information about a problem is provided, the provided information is frequently inadequate.

For example, the application may provide a single error code when a certain type of problem occurs. One error code, such as 123, may be provided whenever storage could not be obtained and another error code, such as 124, may be provided when one computer is unable to communicate with another computer. However, an application may attempt to obtain storage or to communicate with another computer in many different places.

In another example, information about stack based crashes is provided. However, this technique only provides information about operating system problems that resulted in a stack crash. No information is provided about problems that occurred in applications or non-stack based operating system problems.

In yet another example, software that executes on a computer can include invocations to a log facility. When the invocation is executed, a log is written to the log facility. These invocations may be placed, among other things, at the entry and exit of portions of code. Invocations of a log facility for example at the entry and exit of portions of code are frequently known as "full code path logging." Examples of portions of code include but are not limited to methods, procedures, functions, and blocks of code associated with condition statements. Examples of condition statements include, but are not limited to, if statements, else statements, case statements and when clauses. However, full code path logging results in a tremendous amount of information being written, which requires a large amount of storage and uses a large percentage of the central processing unit's (CPU's) cycles. Therefore, full code path logging is disabled during normal operations. Full code path logging is enabled after a problem has occurred and attempts are made to recreate the problem so that information about the execution path that resulted in the problem can be obtained.

As can be seen, single error code technique provides an inadequate amount of information. Stack crash and full code path logging may result in no information for certain types of problems. Further, frequently no information is provided for what is known as "soft errors" where an application can continue to execute after the error.

SUMMARY

This Summary is provided to introduce concepts concerning reporting diagnostic information for code of an application program interface which are further described below in the Detailed Description. This Summary is not intended to identify key features or essential features of the claimed subject matter, nor is it intended to be used as an aid in determining the scope of the claimed subject matter.

A technology for reporting diagnostic information for code of an application program interface is disclosed. In one method approach, diagnostic information for a line of code in a file associated with an application program interface is received. The diagnostic information includes a designation of the line of code. The diagnostic information is stored in a fixed sized buffer. Efficient use of memory is provided without requiring elimination of other diagnostic information previously stored in the fixed sized buffer.

Since, according to one embodiment, the diagnostic information includes the designation of the line of code, a person can determine the exact line of code in an application that a particular problem is related to. For example, one line of code may have the designation "1" and another line of code may have the designation "2" so that a person can determine that diagnostic information with the designation "1" pertains to the former line of code and diagnostic information with the designation "2" pertains to the latter line of code.

DESCRIPTION OF THE DRAWINGS

The accompanying drawings, which are incorporated in and form a part of this specification, illustrate embodiments of the technology for reporting diagnostic information for code of an application program interface and, together with the description, serve to explain principles discussed below.

The drawings referred to in this description should be understood as not being drawn to scale except if specifically noted.

DETAILED DESCRIPTION

Reference will now be made in detail to embodiments of the present technology for reporting diagnostic information for code of an application program interface, examples of which are illustrated in the accompanying drawings. While the technology for reporting diagnostic information for code of an application program interface will be described in conjunction with various embodiments, it will be understood that they are not intended to limit the present technology for reporting diagnostic information for code of an application program interface to these embodiments. On the contrary, the presented technology for reporting diagnostic information for code of an application program interface is intended to cover alternatives, modifications and equivalents, which may be included within the spirit and scope the various embodiments as defined by the appended claims. Furthermore, in the following detailed description, numerous specific details are set forth in order to provide a thorough understanding of the present technology for reporting diagnostic information for code of an application program interface. However, the present technology for reporting diagnostic information for code of an application program interface may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present detailed description, discussions utilizing terms such as "receiving," "storing," "performing," "communicating," "enabling," "retrieving," "transmitting," "generating," or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present technology for reporting diagnostic information for code of an application program interface is also well suited to the use of other computer systems such as, for example, optical and mechanical computers.

Overview

Figure 1:
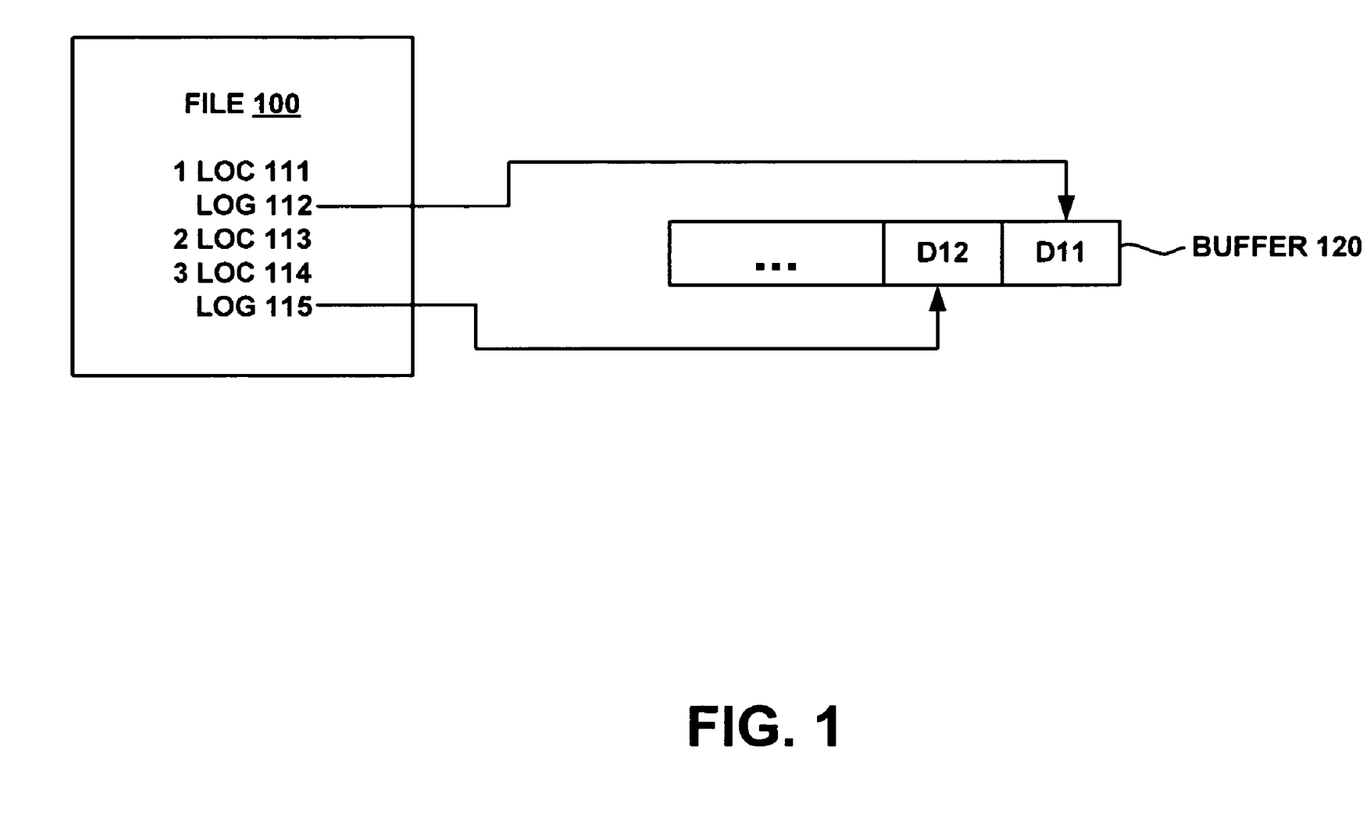
FIG. 1 is a block diagram of a method for reporting diagnostic information for code of an application program interface, according to one embodiment.

As already stated, conventional applications frequently provide no information about a problem and when information about a problem is provided it is frequently inadequate. FIG. 1 is a block diagram of a method for reporting diagnostic information for code of an application program interface, according to one embodiment. An application enables other programs to invoke it with what is commonly known as an application programming interface (API). Code for an application is typically organized in a plurality of files. The application code is stored in a file one line after another. For example, an if statement may be followed with a beginning bracket, such as "{" which may be followed by an assignment statement and so on. Each of the lines of code, according to one embodiment, has a designation. For example, the first line of code (LOC) 111 in a file 100 can have the number "1" associated with it, the second line of code 113 in the file 100 can have the number "2" associated with it and so on for all of the lines of code 111, 113, 114 in a file 100.

A log facility can be invoked after any line of code, according to one embodiment. As depicted in FIG. 1, a log facility is invoked respectively at 112 and 115 after lines of code 111 and 114. The log facility results in diagnostic information DI1 and DI2 being stored in a fixed sized buffer 120. An invocation of the log facility 112 results in diagnostic information DI1 being stored and an invocation of the log facility 115 results in diagnostic information DI2 being stored. The diagnostic information includes a designation of a line of code, such as "1" for LOC 111 and "2" for LOC 113. Since the diagnostic information includes the designation of the line of executed code, a person can determine the exact line of code in an application that a particular problem is related to.

Diagnostic Information

Figure 2:
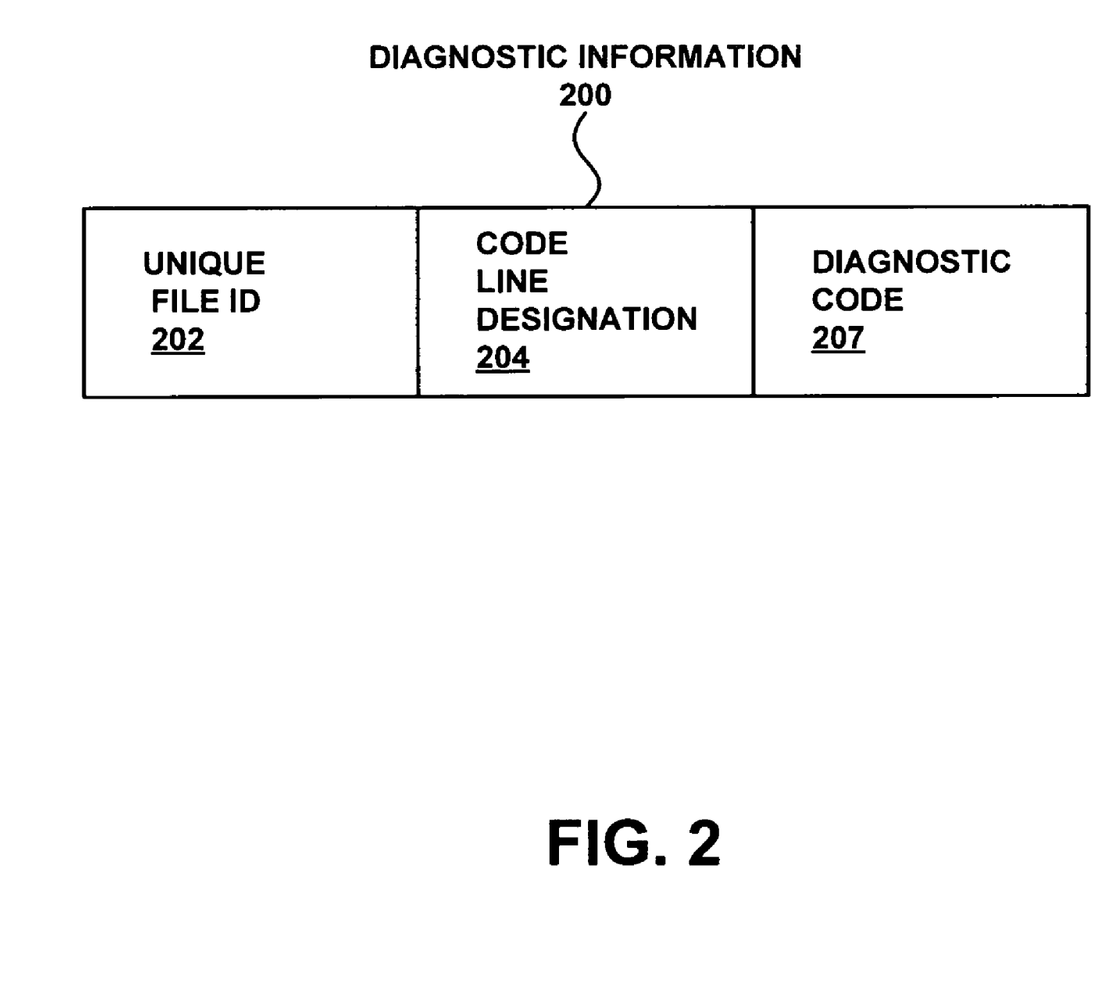
FIG. 2 is a block diagram of diagnostic information, according to one embodiment.

According to one embodiment, a log facility can be invoked after any line of code associated with an application. The log facility causes diagnostic information to be stored. FIG. 2 is a block diagram of diagnostic information, according to one embodiment. The diagnostic information 200 as depicted in FIG. 2 includes a unique file identifier (UFI) 202, a code line designation (CLD) 204 and a diagnostic code 206. Diagnostic information can include the UFI, the CLD and the diagnostic code in a different order than what is depicted in FIG. 2.

According to one embodiment, the UFI 202 uniquely identifies a particular file for an application. A UFI can be a string of characters. For example, the UFI for a particular file may be "D81B2E7D." Although this example of a UFI includes 8 characters, the number of characters may be larger or smaller. Each file for an application can have its own UFI. A UFI can be defined in a header file that is included in any file that refers to the UFI.

The CLD 204 is the designation of a particular line of code in a file, according to one embodiment. For example, assume that the file D81B2E7D has 21 lines of code. The CLD can be any type of string that can be used to identify a particular line of code in a sequence of lines of code. The string may include letters, numbers or a combination thereof, among other things. For example, the first line may have the designation of a number 1, the second line may have the designation of a number 2 and so on to the last line which may have the designation of the number 21. In another example, A-Z can be used to designate the lines of code. In yet another example, A1 . . . A9, B1 . . . B9 and so on can be used to designate the lines of code. In still another example, A01 . . . A99, B01 . . . B99 can be used to designate the lines of code. The CLD 204 is automatically generated, according to one embodiment, therefore a constant defining the CLD is not required. The CLD 204 can designate any type of line of code, such as a source line of code or an assembler line of code that may have been generated, for example from $3^{rd}$ or $4^{th}$ generation language source code. Although many examples of CLDs described herein are 1-3 characters long, a CLD may include more than 3 characters.

The diagnostic code 206 is a code that identifies an execution state of the line of code that preceded the invocation of the logging facility, according to one embodiment. An example of an execution state is an indication of what happened when the line of code executed. The diagnostic code 206 may be an error code, a warning code, or an informational code, among other things. A diagnostic code 206 may be for a hard error, which for example causes execution to terminate, or a soft error, where execution can continue. An error code may be used for a hard error and a warning code may be used for the soft error. An informational code can be used to indicate that a portion of code has been entered or exited. In a specific example, a diagnostic code 204 such as 567 may be used to indicate that storage could not be obtained and a diagnostic code 204 such as 767 may indicate that a computer could not communicate with another computer. Although many examples of diagnostic codes described herein are 3 character long numeric, diagnostic codes can have fewer or more characters and can include other types of characters such as letters.

According to one embodiment, diagnostic information is not stored in the event that the previous line executed successfully. For example, the log facility may be invoked but may not store any diagnostic information if the line that executed prior to the invocation of the log facility executed successfully. However, according to another embodiment, diagnostic information can be stored for non-error situations, such as warnings or information about the previous line of code.

In a specific example of diagnostic information, assume that the $5^{th}$ line of code in the file D81B2E7D fails to obtain storage. The log facility invocation that follows this line of code may result in diagnostic information that includes the string "D81B2E7D5567" where the first 8 characters ("D81B2E7D") are the file's UFI, the $9^{th}$ character ("5") designates the line of code in that file that failed, and the last 3 characters ("567") designate the diagnostic code.

Figure 3:
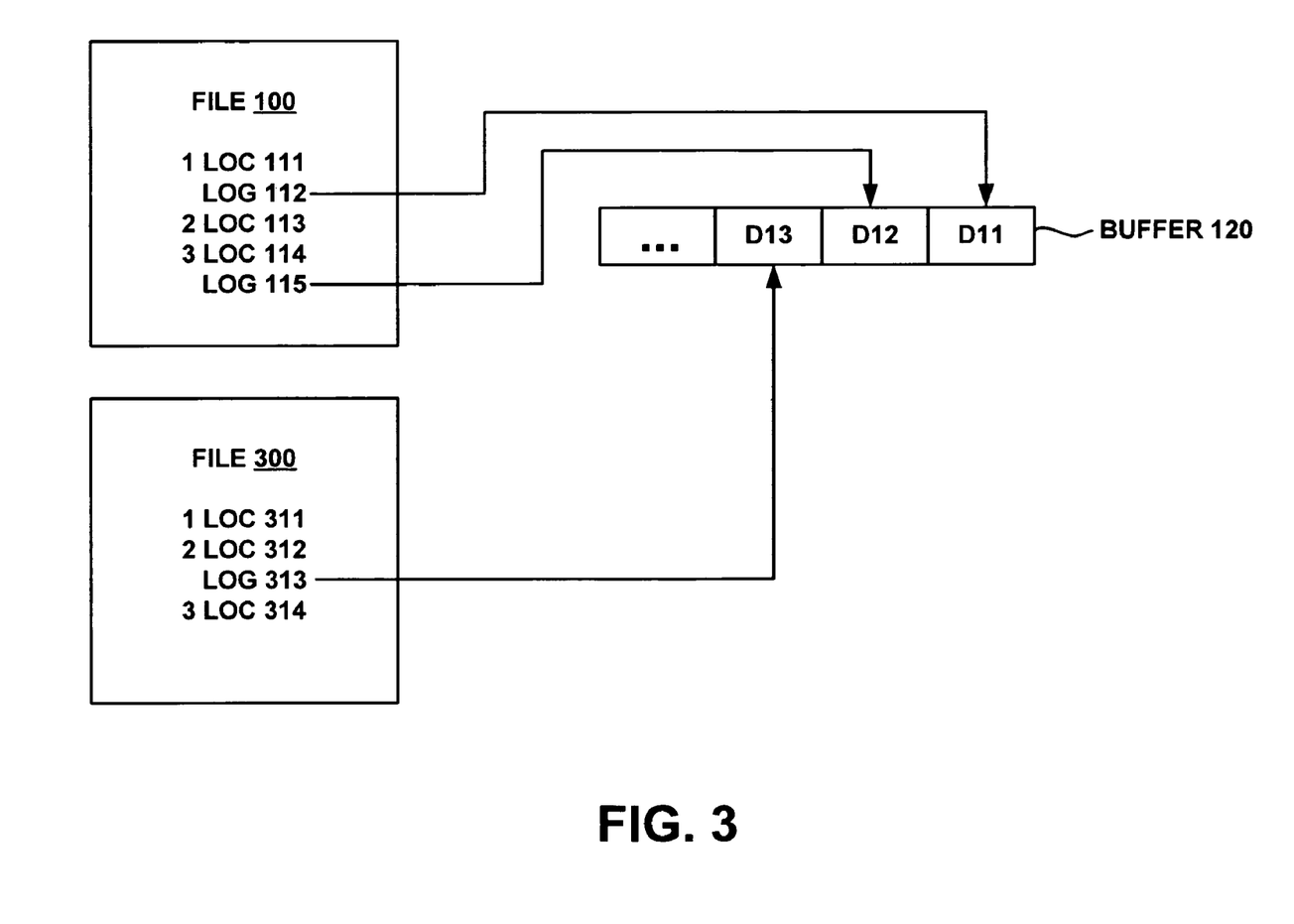
FIG. 3 is a block diagram of a plurality of application files and diagnostic information, according to one embodiment.

FIG. 3 is a block diagram of a plurality of application files and diagnostic information, according to one embodiment. File 100 as depicted in FIG. 1 has already been described herein. File 300 includes LOCs 311, 312 and 314. LOC 312 is followed by an invocation to a log facility 313. Invocations 112, 115 and 313 respectively result in diagnostic information DI1-DI3 being stored in the buffer 120 as indicated by the arrows. Assume that the file 100's UFI is D81B2E7D and the file 300's UFI is D91A3Z8C. Further assume that LOCs 111 and 312 were unable to obtain storage (diagnostic code 567) and LOC 114 was unable to cause one computer to communicate with another computer (diagnostic code 767). In this case, DI1 would include "D81B2E7D1567," DI2 would include "D81B2E7D3767," and DI3 would include "D91A3Z8C2567." The pieces of diagnostic information DI1, DI2, DI3 stored in the fixed sized buffer can be separated by delineators, such as a hyphen or an underscore.

Diagnostic information can be used to determine, among other things, whether code was modified by an unauthorized person. For example, a particular routine may determine whether a user is authorized to call a service. Assume the authorization fails and a piece of diagnostic information is stored indicating the authorization failed. However, at the end of the routine, another piece of diagnostic information is stored which indicates that the authorization succeeded. These two pieces of diagnostic information are an indication that the code of the routine may have been maliciously altered. In another example, pieces of diagnostic information may indicate that code has been altered because the code's execution path is not what would be expected.

Application files that include the lines of code are stored in a computer system typically using a directory. A file is stored in a particular path of the directory. For example, the file "state_machine.exe" may be stored at "video_server_application/protocols/embassy_suites." The full path name "video_server_application/protocols/embassy_suites/state_machine.exe" is conventionally used to specify the file. As can be seen, the full path can become very long and a large amount of storage space would be used to store the full path. The use of a UFI to uniquely identify a particular file provides more efficient use of storage than using conventional full paths.

Designating a file with a UFI is an example of "encoding." The full path name of a file provides unauthorized people with valuable information about the behavior of an application that may enable unauthorized people to maliciously modify the application or to steal the intellectual property of the company that owns the application. Encoding prevents unauthorized people from obtaining information about the behavior of the application.

Various embodiments provide for logging a particular failure for a particular line of code with a relatively small number of characters. Therefore, according to one embodiment, efficient use of memory is provided in part by the compact size of the diagnostic information. Second, efficient use of CPU cycles is provided in part by the compact size of the diagnostic information. Third, the size of the diagnostic information provides for quick and easy communication of the diagnostic information between various entities.

Figure 4:
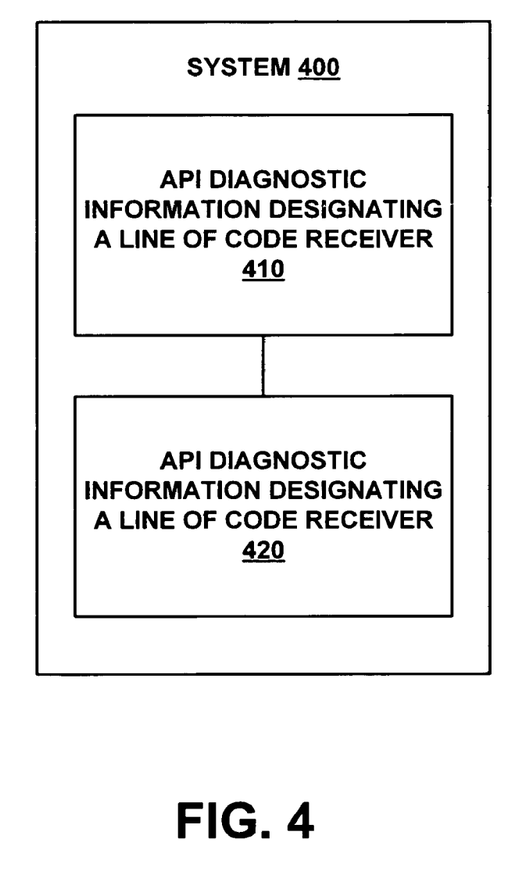
FIG. 4 is a block diagram of a system for reporting diagnostic information for code of an application program interface, according to one embodiment.

A System for Reporting Diagnostic Information for Code of an Application Program Interface FIG. 4 is a block diagram of a system 400 for reporting diagnostic information for code of an application program interface, according to one embodiment. The blocks that represent features in FIG. 4 can be arranged differently than as illustrated, and can implement additional or fewer features than what are described herein. Further, the features represented by the blocks in FIG. 4 can be combined in various ways. The system 400 can be implemented using software, hardware, firmware, or a combination thereof.

The system 400 includes "an application program interface diagnostic information designating a line of code receiver 410" (referred to hereinafter as "receiver") and "an application program interface diagnostic information designating a line of code storer 420" (referred to hereinafter as "storer"). For example, when the log facility is invoked after a line of code has failed, diagnostic information, such as "D81B2E7D5567" can be passed to the log facility as a parameter. The receiver 410 can receive the diagnostic information and the storer 420 can cause the received diagnostic information to be stored, for example, in a fixed sized buffer.

Fixed Sized Buffer

Referring to FIG. 3, according to one embodiment, diagnostic information DI1-DI3 is stored in a fixed sized buffer 120. The received pieces of diagnostic information DI1-DI3 can be stored one after another. For example, the first received piece of diagnostic information (DI1) is stored first. The second received piece of diagnostic information (DI2) is stored next and so on.

The pieces of diagnostic information DI1-DI3 that are stored in the fixed sized buffer 120, according to one embodiment, are transmitted to a diagnostic center. The pieces of diagnostic information can be stored and retrieved in a first in first out order. For example, D1 is transmitted to the diagnostic center, then D2 is transmitted to the diagnostic center and so on.

According to one embodiment, the fixed sized buffer can be implemented as a circular buffer where the newest diagnostic information is stored on top of the oldest diagnostic information when no more space is available in the buffer. According to one embodiment, the fixed sized buffer is large enough so that the typical application can complete execution before the fixed sized buffer runs out of space. According to one embodiment, efficient use of memory is provided in part by using a fixed sized buffer.

A Consumer

According to one embodiment, efficient use of memory is provided without requiring elimination of other diagnostic information previously stored in the fixed sized buffer. For example, since the buffer has a fixed sized, according to one embodiment, potentially the newest diagnostic information may be stored on top of the oldest diagnostic information if the size of the buffer is exceeded. Therefore, according to one embodiment, in conjunction with or instead of storing the diagnostic information in a fixed sized buffer, the diagnostic information can be stored in another file, for example for long term retention, or displayed on a monitor, among other things, so that diagnostic information is not eliminated, as will become more evident.

According to one embodiment, the behavior of storing the diagnostic information in the fixed sized buffer is an example of a "primary behavior" and storing the diagnostic information in another file or displaying it on a monitor are examples of a "secondary behavior" that can occur in parallel with the primary behavior. According to one embodiment, the diagnostic information is provided to what is known as a "consumer" which implements the secondary behavior, as will become more evident.

Figure 5:
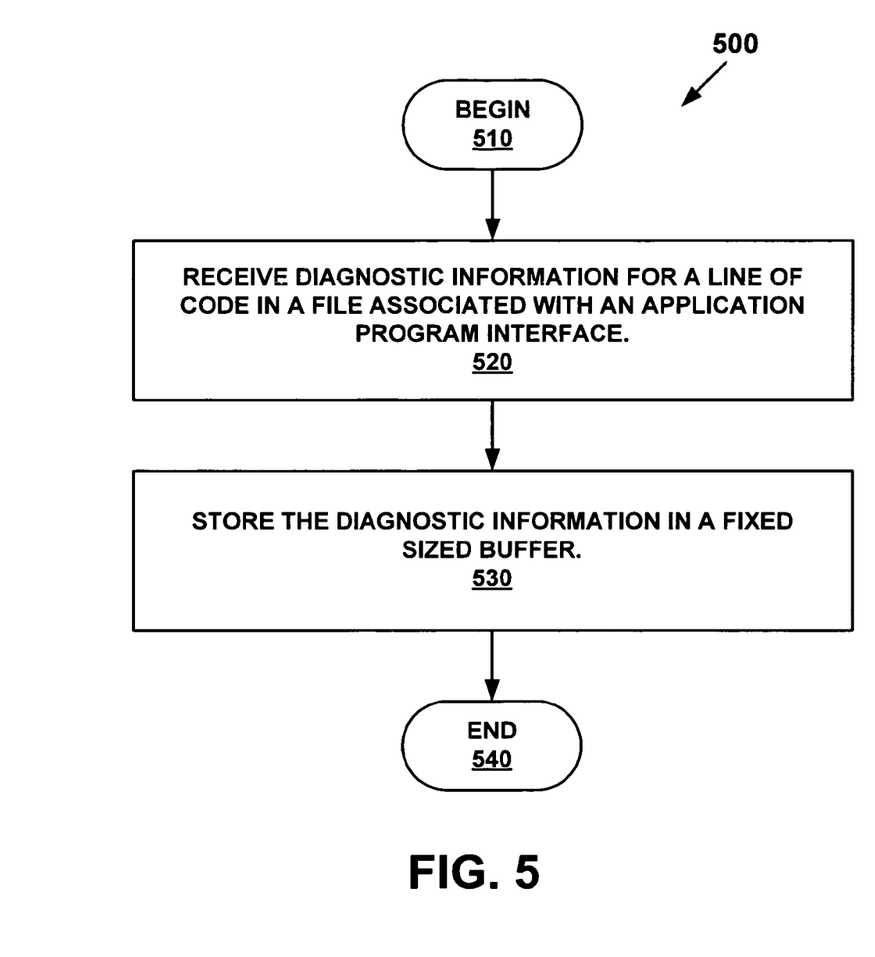
FIG. 5 is a flowchart of a method for reporting diagnostic information for code of an application program interface, according to one embodiment.

A Method for Reporting Diagnostic Information for Code of an Application Program Interface FIG. 5 is a flowchart of a method for reporting diagnostic information for code of an application program interface, according to one embodiment. Although specific steps are disclosed in flowchart 500, such steps are exemplary. That is, embodiments of the present invention are well suited to performing various other steps or variations of the steps recited in flowchart 500. It is appreciated that the steps in flowchart 500 may be performed in an order different than presented, and that not all of the steps in flowchart 500 may be performed.

Figure 6:
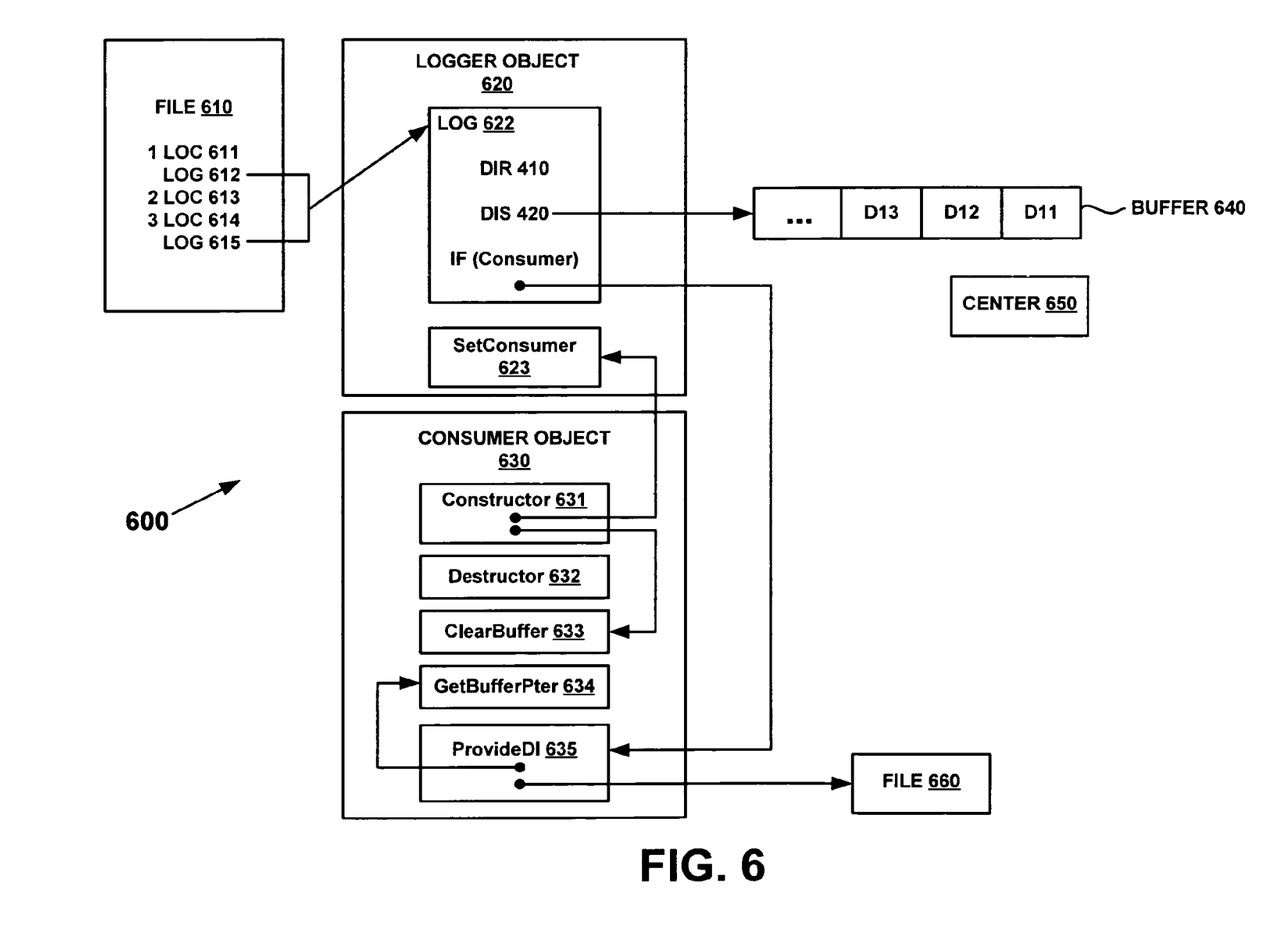
FIG. 6 is a block diagram of a system for reporting diagnostic information for code of an application program interface, according to another embodiment.

The flowchart 500 will be described in the context of FIG. 6. FIG. 6 is a block diagram of a system 600 for reporting diagnostic information for code of an application program interface, according to another embodiment. System 600 includes a file 610 that includes lines of code 611, 613, 614 for an application, invocations of a log facility 612 and 615, a logger object 620, a consumer object 630, a buffer 640, a diagnostic center 650, and another file 660.

According to one embodiment, object oriented programming is used to implement various embodiments of the present invention. However, various embodiments are also well suited for being implemented with non-object oriented languages.

An object is created when an object oriented class is instantiated. An object is also known as "an instance" of that class. As depicted in FIG. 6, the logger object 620 is an instance of a logger class and the consumer object 630 is an instance of a consumer class. The logger object 620 includes the methods Log 622 and SetConsumer 623. The consumer object 630 includes the methods constructor 631, destructor 632, ClearBuffer 633, GetBufferPter 634, and ProvideDI 635. Execution of the constructor 631 results in the consumer object 630 being created from a consumer class and the destructor 632 results in the consumer object 630 being destroyed. Although not depicted in FIG. 6, the logger object 620 also has a constructor and a destructor, according to one embodiment.

Assume that the logger object 620 and the consumer object 630 are created. The consumer object 630's constructor 631 is invoked as a part of creating the consumer object 630. The constructor 631, according to one embodiment, invokes the SetConsumer method 623 in the logger object 620 and passes it (623) a pointer to the newly created consumer object 630. In so doing, the logger object 620 has a pointer to the consumer object 630, which the logger object 620 can use later, as will become more evident. The constructor 631 may also invoke the ClearBuffer method 633, which can remove any old information that is in the fixed sized buffer 640.

A user can interact with their computer which causes an application to execute. An application programming interface is used to invoke the application. The file 610 includes lines of code (LOCs) 611, 613, 614 for that application. LOC 611 and 614 are followed by respective invocations 612 and 615 of the log method 622.

In step 510, the method begins.

In step 520, diagnostic information for a line of code in a file associated with an application program interface is received. The diagnostic information includes a designation of the line of code. The receiver 410 receives control when the log invocations 612 and 615 invoke the log method 622. According to one embodiment, the log method 622 is the receiver 410.

The log method 622 can be implemented to cause the diagnostic information to be stored in the fixed sized buffer 640 and/or to provide the diagnostic information to the consumer object 630.

In step 530, the diagnostic information is stored in a fixed sized buffer. For example, if the respective lines of code 611 and 614 fail, the log method 622 will cause diagnostic information to be stored in the fixed sized buffer 640, according to one embodiment. Assume for this illustration that LOC 611 executes successfully and therefore the log method 622 does not store diagnostic information for LOC 611. However, LOC 614 fails so the log method 622 causes diagnostic information to be stored in the fixed sized buffer when it (622) is invoked by the log invocation 615. According to one embodiment, the storer 420 associated with the log method 622 causes the diagnostic information to be stored in the fixed sized buffer 640.

Since the diagnostic information includes a designation of the line of code, such as a number of the line of code, unique diagnostic information can be reported for different lines of code associated with the application program interface. In a specific example, diagnostic information DI1 can include the designation "1" and diagnostic information DI2 can include the designation "3" which enables unique diagnostic information for LOC 611 and LOC 614. A person looking at DI1 and DI2 can ascertain that DI1 is diagnostic information for LOC 611 and DI2 is diagnostic information for LOC 614.

In step 540, the method ends.

The diagnostic information DI1-DI3 can be transmitted to a diagnostic center 650 using a first in first out order, as described herein. People working at the diagnostic center 650 can analyze the diagnostic information DI1-DI3 to determine the line of code and the problem that resulted in the diagnostic information DI1-DI3.

As already stated, the constructor 631 previously passed a pointer to the SetConsumer method 623 when the consumer object 630 was created. The Log method 622 can use the pointer to the consumer object 630 to determine if the consumer object 630 exists. The log method 622 can also use the pointer to the consumer object 630 to invoke the ProvideDI method 635.

The ProvideDI method 635 can implement a "secondary behavior" such as storing the diagnostic information DI1-DI3 in a file 660. The ProvideDI method 635 can invoke the GetBufferPter method 634 to obtain a pointer to the fixed sized buffer 640 in order to access the diagnostic information DI1-DI3 in the fixed sized buffer 640 and store the diagnostic information DI1-DI3 in the file 660.

According to one embodiment, the consumer object 630 can provide more contextual information in addition to what the diagnostic information provides. For example, the constructor 631 can communicate contextual information to the buffer 640, to the file 660, or a monitor, or any other entity.

The communicated contextual information can indicate, among other things, that the application is entering execution. Similarly, the destructor 632 can communicate contextual information, for example to the same one or more entities, indicating that the application is ending execution. Any method associated with a consumer object 630 can provide additional contextual information.

Any one or more of compact size of diagnostic information, fixed sized buffer, and a UFI, among other things, provide for efficient use of memory according to various embodiments. According to one embodiment, any one or more of a consumer, a secondary behavior, and the compact size of diagnostic information, among other things, provide for efficient use of memory without requiring elimination of other diagnostic information previously stored in the fixed sized buffer. Since memory and/or CPU cycles are used efficiently, various embodiments can be enabled during the normal operation of an application. Therefore, sufficient information about a problem can be captured the first time it occurs thus significantly reducing the probability that the problem would need to be re-created in order to diagnose it.

An Example of a Computer System Environment

Figure 7:
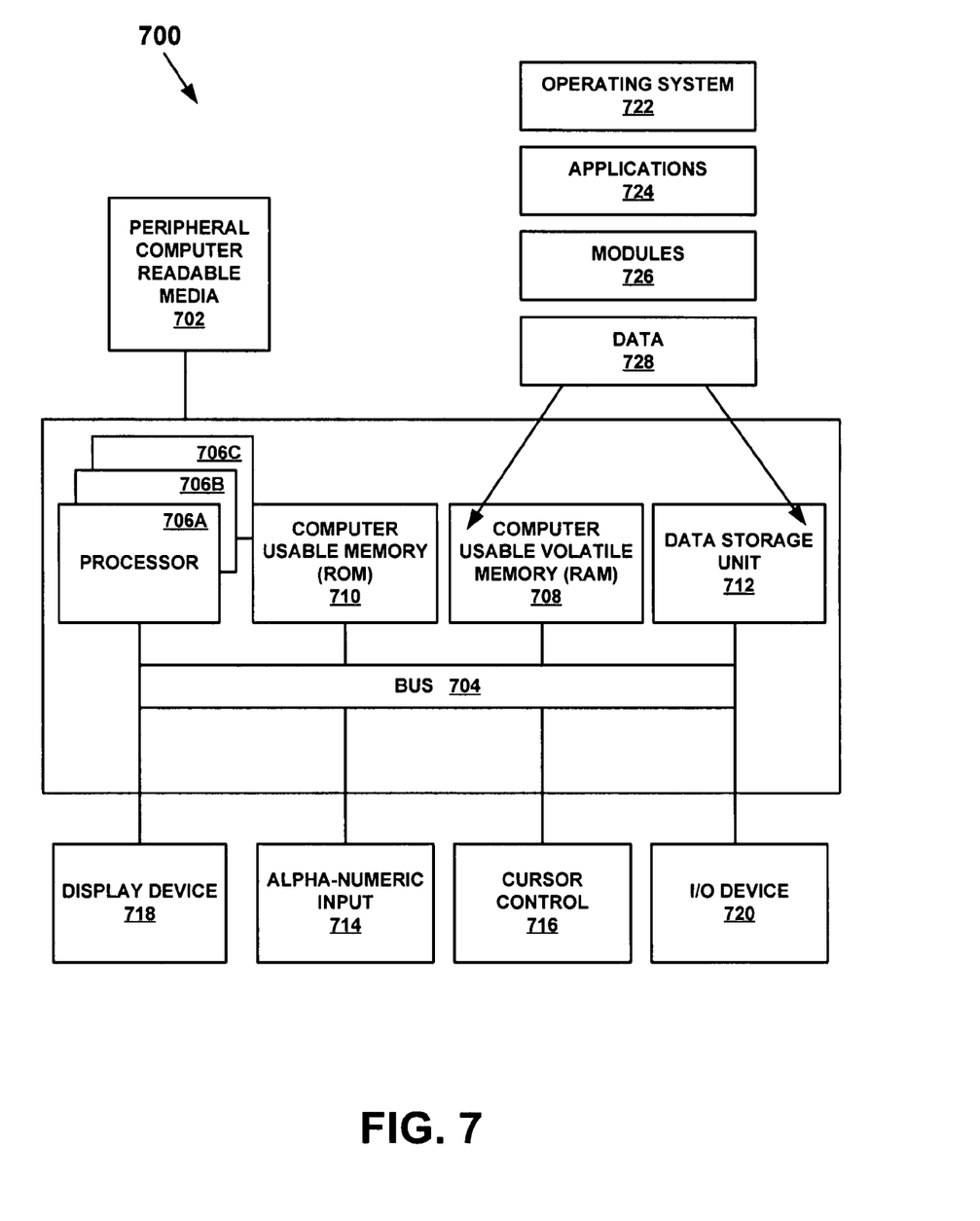
FIG. 7 is a block diagram of an exemplary computer system used in accordance with various embodiments of the present technology for reporting diagnostic information for code of an application program interface.

With reference now to FIG. 7, portions of the technology for reporting diagnostic information for code of an application program interface are composed of computer-readable and computer-executable instructions that reside, for example, in computer-usable media of a computer system. That is, FIG. 7 illustrates one example of a type of computer that can be used to implement embodiments, which are discussed herein, of the present technology for reporting diagnostic information for code of an application program interface. FIG. 7 is a block diagram of an exemplary computer system 700 used in accordance with various embodiments of the present technology for reporting diagnostic information for code of an application program interface. It is appreciated that system 700 of FIG. 7 is exemplary only and that the present technology for reporting diagnostic information for code of an application program interface can operate on or within a number of different computer systems including general purpose networked computer systems, embedded computer systems, routers, switches, server devices, client devices, various intermediate devices/nodes, stand alone computer systems, and the like. As shown in FIG. 7, computer system 700 of FIG. 7 is well adapted to having peripheral computer readable media 702 such as, for example, a floppy disk, a compact disc, and the like coupled thereto.

System 700 of FIG. 7 includes an address/data bus 704 for communicating information, and a processor 706A coupled to bus 704 for processing information and instructions. As depicted in FIG. 7, system 700 is also well suited to a multi-processor environment in which a plurality of processors 706A, 706B, and 706C are present. Conversely, system 700 is also well suited to having a single processor such as, for example, processor 706A. Processors 706A, 706B, and 706C may be any of various types of microprocessors. System 700 also includes data storage features such as a computer usable volatile memory 708, e.g. random access memory (RAM), coupled to bus 704 for storing information and instructions for processors 706A, 706B, and 706C. System 700 also includes computer usable non-volatile memory 710, e.g. read only memory (ROM), coupled to bus 704 for storing static information and instructions for processors 706A, 706B, and 706C. Also present in system 700 is a data storage unit 712 (e.g., a magnetic or optical disk and disk drive) coupled to bus 704 for storing information and instructions. System 700 also includes an optional alphanumeric input device 714 including alphanumeric and function keys coupled to bus 704 for communicating information and command selections to processor 706A or processors 706A, 706B, and 706C. System 700 also includes an optional cursor control device 716 coupled to bus 704 for communicating user input information and command selections to processor 706A or processors 706A, 706B, and 706C. System 700 of the present embodiment also includes an optional display device 718 coupled to bus 704 for displaying information.

Referring still to FIG. 7, optional display device 718 of FIG. 7 may be a liquid crystal device, cathode ray tube, plasma display device or other display device suitable for creating graphic images and alphanumeric characters recognizable to a user. Optional cursor control device 716 allows the computer user to dynamically signal the movement of a visible symbol (cursor) on a display screen of display device 718. Many implementations of cursor control device 716 are known in the art including a trackball, mouse, touch pad, joystick or special keys on alpha-numeric input device 714 capable of signaling movement of a given direction or manner of displacement. Alternatively, it will be appreciated that a cursor can be directed and/or activated via input from alphanumeric input device 714 using special keys and key sequence commands. System 700 is also well suited to having a cursor directed by other means such as, for example, voice commands. System 700 also includes an I/O device 720 for coupling system 700 with external entities. For example, in one embodiment, I/O device 720 is a modem for enabling wired or wireless communications between system 700 and an external network such as, but not limited to, the Internet.

Referring still to FIG. 7, various other components are depicted for system 700. Specifically, when present, an operating system 722, applications 724, modules 726, and data 728 are shown as typically residing in one or some combination of computer usable volatile memory 708, e.g. random access memory (RAM), and data storage unit 712. In one embodiment, the present technology for reporting diagnostic information for code of an application program interface, for example, is stored as an application 724 or module 726 in memory locations within RAM 708 and memory areas within data storage unit 712.

The computer-readable and computer-executable instructions reside, for example, in data storage features such as computer usable volatile memory 708, computer usable non-volatile memory 710, and/or data storage unit 712 of FIG. 7. The computer-readable and computer-executable instructions are used to control or operate in conjunction with, for example, processor 706A and/or processors 706A, 706B, and 706C of FIG. 7. Although specific steps are disclosed in flowchart 500, such steps are exemplary. That is, embodiments are well suited to performing various other steps or variations of the steps recited in flowchart 500. It is appreciated that the steps in flowchart 500 may be performed in an order different than presented, and that not all of the steps in flowchart 500 may be performed.

Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of reporting diagnostic information for code of an application program interface, the method comprising:

receiving diagnostic information for a line of code in a file associated with an application program interface, wherein the diagnostic information includes a designation of the line of code enabling unique reporting of diagnostic information for various lines of code associated with the application program interface;

storing the diagnostic information in a fixed sized buffer; and executing the various lines of code associated with the application program interface both before and during the receiving of the diagnostic information for the line of code.

2. The computer-implemented method of claim 1, the receiving of the diagnostic information comprising:

receiving diagnostic information that includes a unique file identifier.

3. The computer-implemented method of claim 2, the receiving of the diagnostic information that includes the unique file identifier comprising:

receiving diagnostic information that includes an alphanumeric string that uniquely identifies the file.

4. The computer-implemented method of claim 1, the receiving of the diagnostic information comprising:

receiving diagnostic information that includes a diagnostic code, wherein the diagnostic code indicates an execution state of the line of code.

5. The computer-implemented method of claim 1, comprising:

performing a secondary behavior with respect to the diagnostic information in conjunction with the storing of the diagnostic information in the fixed sized buffer.

6. The computer-implemented method of claim 1, comprising:

enabling the receiving of and the storing of the diagnostic information for any line of code associated with the file.

7. The method of claim 1, comprising:

storing the diagnostic information in a fixed sized buffer in a predetermined manner such that elimination of other diagnostic information previously stored in the fixed sized buffer is not required.

8. A system for reporting diagnostic information for code of an application program interface, the system comprising:

an application program interface diagnostic information designating a line of code receiver configured for receiving diagnostic information for a line of code in a file associated with an application program interface, wherein the diagnostic information includes a designation of the line of code and wherein diagnostic information for another line of code includes a different designation; and an application program interface diagnostic information designating a line of code storer configured for storing the diagnostic information in a fixed sized buffer, wherein efficient use of memory is provided without requiring elimination of other diagnostic information previously stored in the fixed sized buffer and wherein the application program interface diagnostic information designating the line of code receiver is coupled to the application program interface diagnostic information designating the line of code storer;

wherein the diagnostic information is stored in the fixed sized buffer and subsequently retrieved from the fixed sized buffer in a first in first out order.

9. The system of claim 8, the diagnostic information transmitted to a diagnostic center.

10. The system of claim 8, the diagnostic information including a unique file identifier.

11. The system of claim 10, the unique file identifier being encoded.

12. The system of claim 8, the diagnostic information enabling detection that at least one line of code associated with the application program interface has been modified by an unauthorized person.

13. The system of claim 8, the receiving of and the storing of the diagnostic information be provided for any line of code associated with the file.

14. The system of claim 8, the designation of the line of code being automatically generated.

15. Instructions on a computer-usable medium wherein the instructions when executed cause a computer system to perform a method of reporting diagnostic information for code of an application program interface, the method comprising:

receiving diagnostic information for a line of code associated with an executing application program interface, wherein the diagnostic information includes a designation of the line of code enabling determination of the line of code the designation pertains to; and storing the diagnostic information in a fixed sized buffer, wherein efficient use of memory is provided without requiring elimination of other diagnostic information previously stored in the fixed sized buffer;

wherein the diagnostic information is stored in the fixed sized buffer and subsequently retrieved from the fixed sized buffer.

16. The computer-usable medium of claim 15, the computer-readable program code embodied therein causing a computer system to perform the method, and the receiving of the diagnostic information comprising:

receiving diagnostic information that includes a unique file identifier.

17. The computer-usable medium of claim 15, the computer-readable program code embodied therein causing a computer system to perform the method, and the receiving of the diagnostic information comprising:

receiving diagnostic information that includes a diagnostic code, wherein the diagnostic code indicates an execution state of the line of code.

18. The computer-usable medium of claim 15, the computer-readable program code embodied therein causing a computer system to perform the method, the method comprising:

performing a secondary behavior with respect to the diagnostic information in conjunction with the storing of the diagnostic information in the fixed sized buffer, wherein the secondary behavior is selected from a group consisting of storing the diagnostic information for long term retention and displaying the diagnostic information.

19. The computer-usable medium of claim 15, the computer-readable program code embodied therein causing a computer system to perform the method, the method comprising:

automatically generating the designation of the line of code.

20. The computer-usable medium of claim 15, the computer-readable program code embodied therein causing a computer system to perform the method, and the receiving of the diagnostic of information for the line of code comprising:

receiving the diagnostic information for the line of code associated with the executing application program interface, wherein the designation provides for identifying the line of code in a sequence of lines of code.

* * * * *